*Hamilton & Post.*
*Shoe Brush.*
Nº 41,700.    Patented Feb. 23, 1864.
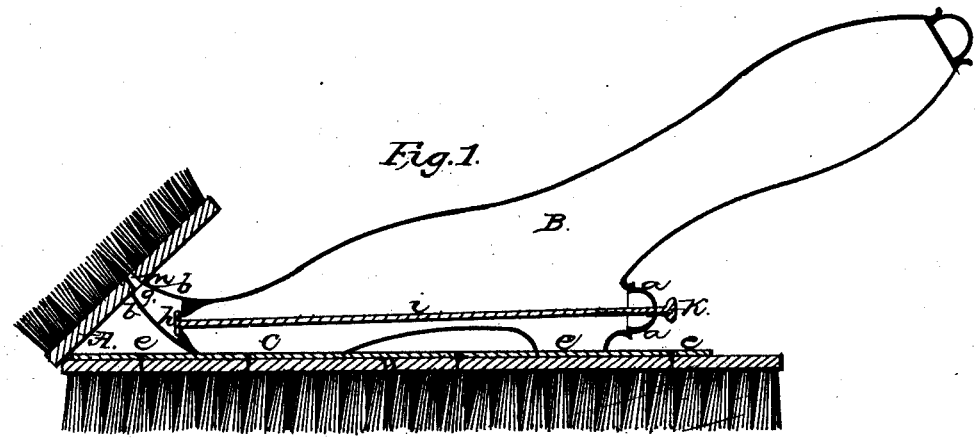
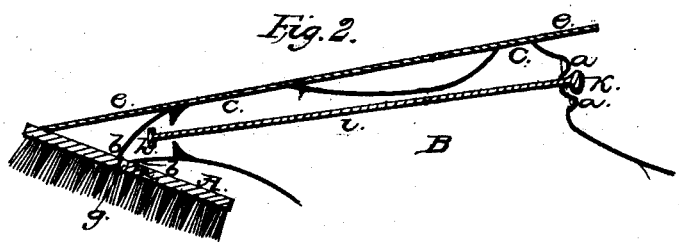
Witnesses:
Inventors:
Gideon Hamilton
John Post
by
Torrey, Brown & Co.
Attorneys.

UNITED STATES PATENT OFFICE.

GIDEON HAMILTON AND JOHN POST, OF NEW YORK, N. Y.

IMPROVED SELF-FEEDING BLACKING-BRUSH.

Specification forming part of Letters Patent No. 41,706, dated February 23, 1864.

*To all whom it may concern:*

Be it known that we, GIDEON HAMILTON and JOHN POST, both of the city of New York, in the county and State of New York, have invented a new and useful Improvement in Self-Feeding Blacking-Brushes; and we do hereby declare that the following is a full and exact description thereof, reference being had to the accompanying drawings, and to the letters of reference marked thereon, in which—

Figure 1 represents a sectional view of our improved self-feeding blacking-brush with the valve closed, and Fig. 2 represents another sectional view of the same with the valve open.

A represents a blacking-brush attached at $b$ $b$ to a handle, B, of tin or its equivalent, which is connected at $c$ $c$ with a tin plate, $e$ $e$, that may be fastened, as shown at Fig. 1 in the drawings, to a polishing-brush, D. The hollow handle B serves as a fountain, which, being filled through the screw-cock $f$, feeds the liquid blacking in any required quantity through the aperture $g$ and tube $m$ into the brush A. This feeding is regulated by the operator by means of the valve $h$, of which the stem $i$ projects from the handle at $k$, where it can be opened at pleasure by the thumb during the process of blacking. $a$ is a combined spring and stuffer, of rubber or its equivalent, attached to the handle of the brush and to the valve-stem $i$. By its elasticity it forces back the valve-stem and keeps the valve $h$ closed.

We do not intend to limit ourselves to the form of handle shown in the drawings, nor to the particular position in which the brushes A and D there appear, but may use any form of handle and place the brushes in any position that may be most convenient; nor to limit ourselves to the particular form of the valve $h$ which is shown in the drawings, but may use any form of valve, and may also use any number of tubes, $m$, to conduct the blacking to the brush.

What we claim as new, and desire to secure by Letters Patent, is—

1. The fountain-handle B of a blacking-brush, so constructed as to be filled with liquid blacking, and to discharge it at pleasure through the tubes $m$, substantially as shown and described.

2. The valve $h$, the valve stem $i$, the thumb-handle $k$, the combined spring and stuffer $a$, when used substantially as and for the purpose described.

GIDEON HAMILTON.
JOHN POST.

Witnesses:
LUCIAN BROWN,
CHAS. H. TARLETON.